March 29, 1949.   R. A. GRINDSTAFF   2,465,647
POULTRY FEED HOPPER
Filed Aug. 4, 1947
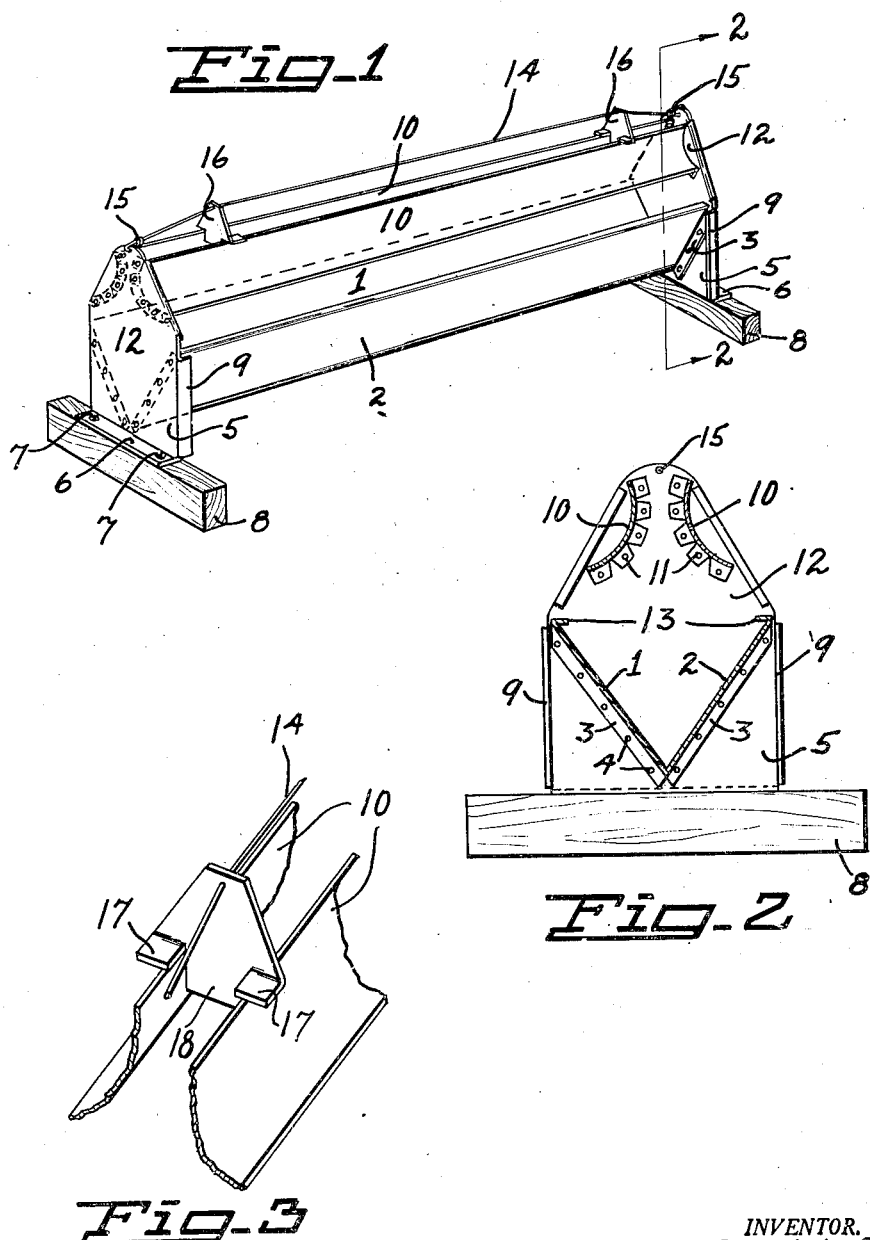
INVENTOR.
Ray A. Grindstaff
BY
ATTORNEY Patented Mar. 29, 1949

2,465,647

UNITED STATES PATENT OFFICE 2,465,647

POULTRY FEED HOPPER

Ray A. Grindstaff, Spokane, Wash.

Application August 4, 1947, Serial No. 765,846

2 Claims. (Cl. 119—61)

My present invention relates to implements employed in animal husbandry, and more specifically to an improved poultry feed hopper or trough especially designed for use as a portable and sanitary chicken feeding device that is composed of a minimum number of parts which may with facility be manufactured at low cost of production and assembled with convenience to constitute a feeding device of this type that is efficient in the performance of its required functions.

The invention consists in certain novel features of construction and combinations and arrangements of parts as will hereinafter be described in detail and more particularly set forth in the appended claims.

In the accompanying drawings I have illustrated a complete example of a physical embodiment of my invention in which the component parts are combined and arranged in accord with one mode I have devised for the practical application of the principles of my invention.

It will however be understood that changes and alterations are contemplated and may be made in these exemplifying drawings and mechanical structures, within the scope of my claims, without departing from the principles of the invention.

Figure 1 is a perspective view of a chicken feeding trough in which a preferred form of my invention is physically embodied.

Figure 2 is a vertical transverse sectional view of the feeding trough as at line 2—2 of Fig. 1; and Figure 3 is an enlarged fragmentary perspective view of the upper structure of the trough, showing the anti-roosting wire and guard rails.

In this form of the invention I utilize a V-shaped trough composed of walls 1 and 2 that may be stamped or pressed from metal, or other suitable material, and fashioned with exterior end flanges 3, which are attached as by rivets 4 to the duplicate end walls or plates 5, 5; and these end plates are provided with bottom end flanges 6 that are secured by screws or nails 7 to the spaced sills 8, 8, of wood or other material. For strengthening the light-weight end walls they may be provided with integral vertically disposed reinforcing flanges 9 that maintain the end walls in rigid upright position for rigidly supporting the longitudinal side walls of the trough.

The trough is partially covered with a ventilating hood made up of two longitudinally extending plates 10, 10, concave-convex in cross section, with the concave sides forming exterior smooth surfaces for shedding feed, allowing it to fall back into the trough, and guarding the trough by excluding the poultry from mounting or walking on the structure. These guard rails or plates, which are separated at their upper converging edges to form a ventilating slot, extend the full length of the trough and they are provided with attaching flanges 11, 11 that are secured by screws to the upper pointed ends 12, 12 of the end walls.

The outspreading bottom edges of the guard rails terminate inwardly of and above the upper edges of the V-shaped side walls to form two oppositely arranged feed openings, slots, or mouths of the trough, and the side walls at their upper edges are fashioned with horizontal inturned flanges 13. By this construction and arrangement of parts the fowl have ready access to the interior of the feed trough, the chicken may turn its head sidewise for picking up the feed, and the flanges 13 prevent the chicken from withdrawing the feed from the trough while feeding.

In addition to the guard rails, and to prevent the chickens from roosting on the trough, an anti-roosting wire 14 is stretched longitudinally of the trough over the top ventilating slot, and attached at its ends at 15, 15 to the pointed upper ends or peaks 12, 12 of the end walls.

The wire is braced and held taut by means of two adjustable bridge-brackets 16, 16, having holes through which the wire passes, and these upright brackets are supported on the top edges of the guard rails or hood of the trough by means of integral horizontal lugs 17, with the lower portions or bases 18 frictionally engaging the inner adjoining surfaces of the guard rails.

The guard rails or brackets 10, 10, prevent the chickens from getting into the feed trough, and the anti-roosting wire presents a precarious support and hazard that prevents the chicken from roosting on the trough.

From this description taken in connection with my drawings it will be apparent that the feeding device may readily be maintained in sanitary condition, and the chickens may feed without a substantial loss or waste of the feeding material.

Having thus fully described my invention, what I claim as new and desire to secure by Letters Patent is:

1. The combination with an open top feeding trough having upright end walls, of a pair of longitudinally extending guard rails having exterior concave faces and attached to the end walls, said rails forming an upper ventilating slot and with their lower edges terminating above the trough to form feeding slots, an anti-roosting wire located above the ventilating slot with its ends connected to the end walls, spaced adjustable bridge-brackets mounted on the guard rails, and said brackets having holes through which the wire passes.

2. The combination with an open top feeding trough having spaced end walls, of a pair of upper concavo-convex longitudinally extending guard rails attached to the end walls and forming an upper ventilating slot, the lower edges of the rails terminating above the trough to form opposed feeding slots, an anti-roosting wire suspended between the end walls, a pair of adjustable and perforated bridge-brackets for said wire, each said bracket having a pair of supporting lugs mounted on the top edges of the rails, and a base portion of the brackets frictionally engaging the guard rails.

RAY A. GRINDSTAFF.

REFERENCES CITED

The following references are of record in the file of this patent:

UNITED STATES PATENTS

| Number | Name | Date |
| --- | --- | --- |
| 364,327 | Wood | June 7, 1887 |
| 1,234,054 | McCandlish | July 17, 1917 |
| 1,251,374 | Hosch | Dec. 25, 1917 |
| 1,771,647 | Moe | July 29, 1930 |
| 1,874,418 | Bantz et al. | Aug. 30, 1932 |